UNITED STATES PATENT OFFICE 1,926,587

PROCESS FOR THE PRODUCTION OF HYDROGEN

Fritz Hansgirg, Vienna, Austria, assignor to American Magnesium Metals Corporation, Pittsburgh, Pa., a corporation of Delaware No Drawing. Original application May 29, 1930, Serial No. 457,500, now Patent No. 1,836,919, and in Austria June 18, 1929. Divided and this application February 19, 1931. Serial No. 517,114

9 Claims. (Cl. 23—212)

This invention relates to a process for the production of hydrogen from steam and more particularly to such a process involving the use of an improved catalyst. This application is a division of my application Serial Number 457,500, filed May 29, 1930 (patent number 1,836,919 issued December 15, 1931).

The decomposition of water by means of incandescent carbon, as in the preparation of water gas, takes place according to the following equation:

(I) $\quad 2C + 2H_2O = 2CO + 2H_2 - 57.2$ kg. cals.

At lower temperatures below 1,000 degrees C, $CO_2$ is formed in addition to the CO in accordance with the equation:

(II) $\quad C + 2H_2O = CO_2 + 2H_2 - 18.0$ kg. cals.

A state of equilibrium, depending on the temperature, is set up between the CO and the $CO_2$, which equilibrium is displaced at high temperatures in favor of the CO. Since, theoretically, the formation of hydrogen according to Equation II gives rise to a gaseous mixture free from carbon monoxide, and, in addition, requires a much smaller expenditure of heat, it would be of advantage to prepare hydrogen from steam in accordance with that equation. The gaseous mixture obtained at the lower temperature range would also be most suited for the commercial recovery of hydrogen gas, since the removal of carbon dioxide is easier in practice than is the elimination of carbon monoxide. At the temperatures at which the equilibrium defined in Equation II takes place, the reaction velocity is much too slow for practical working due to its progressive decrease with lower temperatures.

Attempts have been frequently made to overcome this inconvenience in order to make possible the direct recovery of hydrogen, almost free from carbon monoxide by conducting the process in accordance with Equation II. In order to increase the velocity of the reaction, it has been proposed, inter alia, to employ, as catalysts, hydrates or carbonates of the alkalis, or the corresponding water-soluble compounds of the alkaline earths. According to these known processes materials containing carbon and impregnated with the said water-soluble compounds were to be exposed, in an incandescent state, to the action of ordinary or super-heated steam.

The proposals advanced in this direction, however, did not prove successful, and consequently, for the commercial recovery of hydrogen, the water gas process was allowed to proceed at high temperature, the carbon monoxide being then removed from the resulting gaseous mixture in a separate operation.

The present invention solves, in the first place, the problem of the direct production of a mixture of hydrogen and carbon dioxide, low in, or free from, carbon monoxide, by the action of steam on carbon (or solid substances containing carbon), in the presence of additions which accelerate the reaction, and under conditions substantially approximating Equation II of the water gas process.

According to the invention, the process is conducted with the employment of magnesia, magnesium carbonate or magnesium hydroxide, as catalysts, at a temperature which, though above the decomposition temperature of magnesium carbonate, does not substantially exceed 750° C.

The invention is based upon the fact that the equilibria associated with the reaction $$2CO \rightleftarrows C + CO_2,$$

are of decisive importance for the production of hydrogen free from carbon monoxide. From this point of view, the temperature of 500° C. is the most favorable temperature for the reaction, in that, at this temperature, the equilibrium is practically completely displaced, in favor of carbon dioxide. Above 500° C., $CO_2$ in the presence of C, is reconverted into CO to an increasing extent as the temperature rises, so that, for the formation of a gaseous mixture low in carbon monoxide, the range of temperature above 750° C. is not longer to be considered. Below 700–750° C., however, the reaction velocity of the hydrogen process is already retarded to such an extent that the reaction cannot be carried out on a technical scale. The problem therefore arose of finding an effective and insensitive contact mass which will enable the reaction velocity of the formation of hydrogen to be sufficiently increased in the range of temperature below 750° C. A mixture of carbon with magnesium carbonate has been found admirably suited for the purpose. This is based on the relatively low decomposition temperature of magnesium carbonate, which can be reduced to even below 500° C. by diluting the gas phase with steam, and thereby lowering the partial pressure of the carbon dioxide.

At 500° C. the reaction $$MgCO_3 \rightleftarrows MgO + CO_2$$

occurs to form an equilibrium, when the amounts of steam employed correspond to the stoichiometrical proportions of Equation II, or only slightly exceed those proportions. Magnesium carbonate therefore has the capacity of rapidly absorbing, and again parting with, carbon dioxide in the hydrogen process conducted in accordance with Equation II, at the optimum temperature suitable for reliably preventing the formation of carbon monoxide. This is not the case, either with the alkali carbonates or calcium carbonate. According to the invention, the performance of the hydrogen process with the use of magnesium carbonate as catalyst, at temperatures which do not substantially exceed 500° C., enables hydrogen practically free from carbon monoxide, to be obtained directly.

If, for example, wood charcoal be mixed with magnesium carbonate, in the proportions of 100 parts by weight of charcoal to 5-25 parts by weight of magnesium carbonate, and such mixture be treated, at about 500° C., with the stoichiometrical amount of steam (corresponding to 2 molecules of $H_2O$ to 1 mol. of C), the reaction proceeds in practical accordance with Equation II and with quite sufficient velocity. The process is also of importance for the production of mixtures of hydrogen and carbon dioxide. However, since, as is known, the carbon dioxide can be easily separated from this mixture, the process primarily affords a practically applicable method for the recovery of pure hydrogen.

Of course, magnesium oxide or hydroxide, which are immediately converted into magnesium carbonate, can be introduced into the reaction in place of magnesium carbonate. The process can also be carried out with crude materials which contain magnesium oxide or hydroxide in sufficient amount. The catalyst remains unaltered in composition and active, without regeneration, so that only the gasified carbon has to be replaced. Since the course of the reaction for the formation of hydrogen in accordance with Equation II is slightly endothermic, the reaction temperature of approximately 500° C. can be maintained by the application of a very small amount of heat.

*Example*

An intimate mixture of wood charcoal and calcined magnesite, and containing, for example, 1 part by weight of magnesium oxide for every 4 parts by weight of charcoal, is allowed to descend through an externally heated shaft furnace in which the contact mass is maintained at about 500° C. Steam is passed in counter flow, through the descending charge. The contact mass, low in charcoal, issuing at the lower end of the shaft is again mixed with sufficient added charcoal to restore the desired magnesium-oxide-charcoal ratio, and the resulting mixture is returned into the top of the shaft furnace, thus permitting a cyclic operation of the process. In this manner, 30-40% of the introduced carbonaceous substance can be converted per hour. The shaft furnace may also be replaced by a rotary tube furnace, operated in a similar manner.

If the carbon dioxide be removed from the resulting mixtures with hydrogen (free from carbon monoxide) in the known manner, for example by washing with water under pressure, this very simple process furnishes perfectly pure hydrogen, in a direct manner, that is, without any chemical purification being required.

The value, as an improvement, of the present process which, by the employment of a very cheap and insensitive contact mass, solves the problem of the direct gasification of a carbonaceous material such as charcoal, in the presence of steam, to form hydrogen low in, or free from, carbon monoxide, and also enables the complete subsequent elimination of carbon monoxide from mixtures of the same kind containing the latter, becomes particularly apparent by comparison with the said known process which merely aims to free water gas from carbon monoxide by subsequent oxidation with the aid of expensive and sensitive catalysts.

The term "an oxygen compound of magnesium" as used in the appended claims is intended to include only magnesium oxide, substances yielding magnesium oxide on being heated up to the temperatures occurring in the present process, and mixtures of magnesium oxide with substances yielding magnesium oxide under the temperature conditions of the present process, such as more particularly magnesium carbonate.

What is claimed is:

1. The process of obtaining hydrogen, including reacting steam with an intimate mixture of a solid carbonaceous material and a catalyst comprising an oxygen compound of magnesium.

2. The process of obtaining hydrogen, including reacting steam with an intimate mixture of a solid carbonaceous material and a catalyst comprising an oxygen compound of magnesium at a temperature of substantially 500° C.

3. The process of obtaining hydrogen, including reacting steam with a mixture of charcoal and magnesium carbonate.

4. The process of obtaining hydrogen, including reacting steam with a mixture comprising 100 parts of charcoal and 5 to 25 parts of magnesium carbonate.

5. The process of obtaining hydrogen, including reacting steam with an intimate mixture of a solid carbonaceous material and a catalyst comprising magnesium oxide.

6. The process of obtaining hydrogen, including reacting steam with an intimate mixture of a solid carbonaceous material and a catalyst comprising magnesium hydroxide.

7. The process of obtaining hydrogen, including reacting steam with a mixture comprising 100 parts of charcoal and 5 to 25 parts of magnesium corbonate, the steam being present in the stoichiometrical amount of two molecules of $H_2O$ to 1 molecule of carbon.

8. The process of obtaining hydrogen, including reacting steam with a mixture of a carbonaceous material and an oxygen compound of magnesium at a temperature not substantially exceeding 750° C., whereby to form hydrogen and carbon dioxide according to the equation:

$$C + 2H_2O = CO_2 + 2H_2 - 18.0 \text{ kg. cal.};$$

and washing the so-formed reaction products with water under pressure to remove the carbon dioxide.

9. The process of obtaining hydrogen, including passing steam and a mixture of a carbonaceous material and an oxymagnesium compound of the group consisting of magnesium carbonate, magnesium oxide, magnesium hydroxide in counter-current through a reaction chamber maintained at a temperature not substantially exceeding 500° C., whereby to form hydrogen and carbon dioxide according to the equation:

$$C + 2H_2O = CO_2 + 2H_2 - 18.0 \text{ kg. cal.};$$

withdrawing the evolved gaseous mixture and washing the same with water under pressure to remove the carbon dioxide; replenishing the spent reaction mixture with added carbonaceous material, and returning the replenished reaction mixture to the process.

FRITZ HANSGIRG.